(12) United States Patent
Feldmeier

(10) Patent No.: US 8,807,518 B2
(45) Date of Patent: Aug. 19, 2014

(54) ASEPTIC OR SANITARY DIAPHRAGM VALVE

(71) Applicant: Robert H Feldmeier, Fayetteville, NY (US)

(72) Inventor: Robert H Feldmeier, Fayetteville, NY (US)

(73) Assignee: Feldmeier Equipment, Inc., Syracuse, NY (US)

( * ) Notice: Subject to any disclaimer, the term of this patent is extended or adjusted under 35 U.S.C. 154(b) by 0 days.

(21) Appl. No.: 13/688,837

(22) Filed: Nov. 29, 2012

(65) Prior Publication Data

US 2014/0027661 A1 Jan. 30, 2014

Related U.S. Application Data

(63) Continuation-in-part of application No. 12/883,518, filed on Sep. 16, 2010, now Pat. No. 8,522,824, which is a continuation-in-part of application No. 12/766,009, filed on Apr. 23, 2010, now abandoned.

(51) Int. Cl.
*F16K 31/122* (2006.01)
*F16K 31/22* (2006.01)

(52) U.S. Cl.
USPC ..................... 251/63.5; 251/335.2

(58) Field of Classification Search
CPC ......... F16K 1/302; F16K 1/305; F16K 1/307; F16K 31/18; F16K 31/20; F16K 31/22; F16K 33/00; F16K 41/10; F16K 41/12; F16K 31/122; F16J 15/52
USPC ........ 251/335.1, 335.2, 335.3, 63.5; 137/389, 137/410
See application file for complete search history.

(56) References Cited

U.S. PATENT DOCUMENTS

| | | | | |
|---|---|---|---|---|
| 629,249 | A * | 7/1899 | Hardin | 137/390 |
| 2,348,388 | A * | 5/1944 | Jenkins | 137/505.42 |
| 2,665,712 | A * | 1/1954 | Pratt | 251/63.5 |
| 2,713,988 | A * | 7/1955 | Kitterman | 251/322 |
| 3,838,707 | A | 10/1974 | Wachowitz, Jr. | |
| 4,166,606 | A * | 9/1979 | Kawolics et al. | 251/214 |
| 4,175,591 | A | 11/1979 | Welker | |
| 5,125,622 | A * | 6/1992 | Kalaskie et al. | 251/63.4 |
| 2006/0151737 | A1* | 7/2006 | Newberg | 251/335.2 |
| 2011/0260091 | A1* | 10/2011 | Feldmeier | 251/331 |

FOREIGN PATENT DOCUMENTS

DE  361651  * 10/1922

* cited by examiner

*Primary Examiner* — John K Fristoe, Jr.
*Assistant Examiner* — Jonathan Waddy
(74) *Attorney, Agent, or Firm* — Bernhard P. Molldrem, Jr.

(57) ABSTRACT

An aseptic valve or sanitary valve employs a floating plug situated within a cylindrical valve housing. The floating valve plug has a head that seats against an inlet opening, and has a stem and a generally conic foot that rests upon a diaphragm formed of a flexible, food-grade membrane. An actuator below the diaphragm urges the plug up to lodge against the inlet opening, and relieves force on the membrane and plug to open the valve. Spacer arms radiate from the stem or head of the plug, to keep the plug centered in the housing.

5 Claims, 2 Drawing Sheets

ASEPTIC OR SANITARY DIAPHRAGM VALVE

This is a continuation-in-part of and commonly-assigned U.S. patent application Ser. No. 12/883,518, filed Sep. 16, 2010, which is a continuation-in-part of application Ser. No. 12/766,009, filed Apr. 23, 2010, now abandoned.

BACKGROUND OF THE INVENTION

This invention relates to equipment for processing of liquids that must be kept aseptic, i.e., pharmaceuticals, dairy products, other food products for human consumption, beauty products, skin care products, and the like. The invention is more particularly concerned with sanitary valves of the type used in the dairy, food processing, and/or pharmaceutical industries, in which the flow of a fluid is to be regulated or diverted from one flow path to another. The invention is more directly concerned with diaphragm valves, that is, valves of the type in which a flexible membrane isolates the mechanical portions of the valve from the flow of fluid. The invention is more specifically concerned with a diaphragm valve of simple design and which can be cleaned and sterilized in place by the flow of a cleaning liquid through the valve. Sanitary diaphragm valves of this type can be used in a milk pasteurization line e.g. as a pressure regulating valve. These valve may also be employed as a drain valve for a sanitary tank to connect the tank to subsequent stage(s) in a processing line.

In order to ensure that the sanitary tank and conduit can be cleansed and sanitized between processes, the processing flow path, including any valves, need to be designed so that all components can be completely cleaned in place of any product by washing it and rinsing it with a cleaning fluid that must reach every point on the interior of the conduit, including every point in the valve cavities. No threaded connectors can be used anywhere that the liquid product flows, because of the difficulty in cleaning the threads. Any threads need to be sealed off and isolated from any contact with the processed fluid. In order to accommodate this requirement, the sanitary valves used in the dairy industry, food processing industries, pharmaceutical industry, have been complex and difficult to repair and maintain, and represent a significant capital expense.

OBJECTS AND SUMMARY OF THE INVENTION

It is an object of the present invention to provide an aseptic or sanitary diaphragm valve arrangement of simple construction, capable of being cleaned in place when installed in conduits for liquid food products, pharmaceuticals, beauty care products, or any other product which must be processed under sanitary conditions. The diaphragm valve must be capable of controlling flow and/or pressure of the liquid product, but should also be of simple, reliable, and sturdy construction so as to avoid the drawbacks of the prior art.

It is another object to provide an aseptic or sanitary valve that is employs a floating valve plug contained within a cylindrical valve body, and which avoids any need to machine or manufacture complex surfaces within the valve cavity.

Another object is to provide a valve design permitting the valve to be constructed of a minimum number of parts.

It is a further object to provide a diaphragm valve that is capable of reliably opening and closing to regulate the flow of fluids in the sanitary flow path.

According to one aspect of the invention, a sanitary or aseptic diaphragm valve is provided for use in connection with the outlet or drain of a sanitary tank or other vessel, such as a mixer or blender, in which a product is manufactured, processed or stored under sanitary conditions. The sanitary diaphragm valve is has a generally cylindrical valve body formed of a cylindrical wall, and with an upper plate at the upper end of the cylindrical wall. The plate has a circular inlet opening, whose circumferential edge forms a valve seat. There is also an annular plate disposed at a lower end of the cylindrical wall and this having an center opening or aperture. A tubular outlet pipe extends out from an opening in the cylindrical wall.

A floating valve plug is situated within said valve body along the cylindrical axis The valve plug has a head at its upper end, with the head having an upper valve face of round profile that is disposed to seat against the circumferential edge of the circular inlet opening. A valve plug stem aligns axially with the cylindrical wall and extends from the head downward within the valve body. A foot portion is formed at a lower end of said stem. To keep the plug aligned and centered in the valve body, there are angularly spaced radial arms or spokes that extend from either the head or the top part of the stem, or both, radially out to an inner surface of the valve body cylindrical wall. These keep the floating valve plug centered on the cylindrical axis the valve body.

A flexible diaphragm, e.g., a tough, food-grade silicone rubber sheet, is situated across the center opening of the annular plate at the lower end of the cylindrical wall. The foot of the floating plug rests upon it, but the valve plug foot is not attached to nor does it penetrate the diaphragm.

A valve actuator arrangement is disposed beneath the valve housing. This includes a valve actuator housing that has an annular flange at its upper end. The annular flange also has an open center. The annular flange is positioned against the annular plate of the valve body, and fastened to it, e.g., bolted or clamped, with the flexible diaphragm sandwiched between the annular flange and the annular plate. A valve actuator member situated within the valve actuator housing is movable over a given travel distance along the axis of the valve housing. A tip or upper edge of this valve actuator member pushes against the under side of the diaphragm. At the upper end of its travel distance, the actuator member urges the upper valve face of the plug against the circumferential edge, to wit, the valve seat, of the inlet opening. As the actuator member moves away from the upper end of its travel distance, force is relieved on the plug, and this permits the upper valve face of the plug to move away from the circumferential edge and permit flow of fluid through the circular inlet opening, into the valve body, and then out through the outlet pipe.

A closing force is applied to the valve actuator member to urge it and the associated valve plug to a raised position to effect seating of the upper valve face of the plug against the seat, or circumferential edge. This closing force can be controllably released or relieved, to allow the valve actuator member and valve plug to descent to a lowered position to permit opening of the plug member from said circular inlet.

In a favorable embodiment, the foot portion of the valve plug has a domed bottom surface that rests on said diaphragm. This facilitates the flow of the C.I.P. cleaning fluid over these surfaces during a cleaning operation.

The group of radial arms can comprise three spacer arms disposed at 120 degree intervals around the valve plug axis.

In preferred embodiments of this valve, the valve actuator housing includes a leakage-evident opening through its wall, so that if a leak develops in the diaphragm, it will create a visible drop of liquid at that opening. The leakage-evident opening need not be in any specific location, but must be in a zone of the valve actuator housing that is in fluid communication with the diaphragm. In the event that a tear or perforation occurs in the diaphragm, any process liquid will flow into the space beneath, out the opening, where it will provide a visible indication of a fault.

The valve actuator can include an air cylinder aligned with the valve housing, with an air piston located within the air cylinder. In one possible embodiment, the valve actuator member can be in the form of a rod that is affixed onto piston. An apertured plate in the cylinder has a central passage through which the valve actuator member passes. Compressed air is applied to the cylinder to raise the piston and actuator member.

In some preferred constructions, the foot portion of the plug may be frustoconic in shape. The circumferential edge or valve seat may have a bevel where the plug face seats against it. Air pressure can be controlled to permit the piston and the valve plug to descend a controlled amount so as to regulate flow of the liquid between cut-off and full flow.

In alternative embodiments, a spring may apply an upward closing force, and air pressure may be introduced to cause the piston to descend and compress the spring when it also relieves the closing force on the valve plug, for a normally-closed valve embodiment, in which air pressure is applied to open the valve.

Tri-clamps or equivalent sanitary clamp means may be used to attach the cylinder components and the diaphragms. The tri-clamp allows the valve to be partly disassembled for maintenance or repair on-station. The tri-clamp is a well known and available device, and need not be discussed in detail here.

The above and many other objects, features, and advantages of the arrangements of the present invention will become apparent from the ensuing detailed description of preferred embodiments of the invention, when read in connection with the accompanying Drawing.

DETAILED DESCRIPTION OF THE PREFERRED EMBODIMENT

Figure 1:
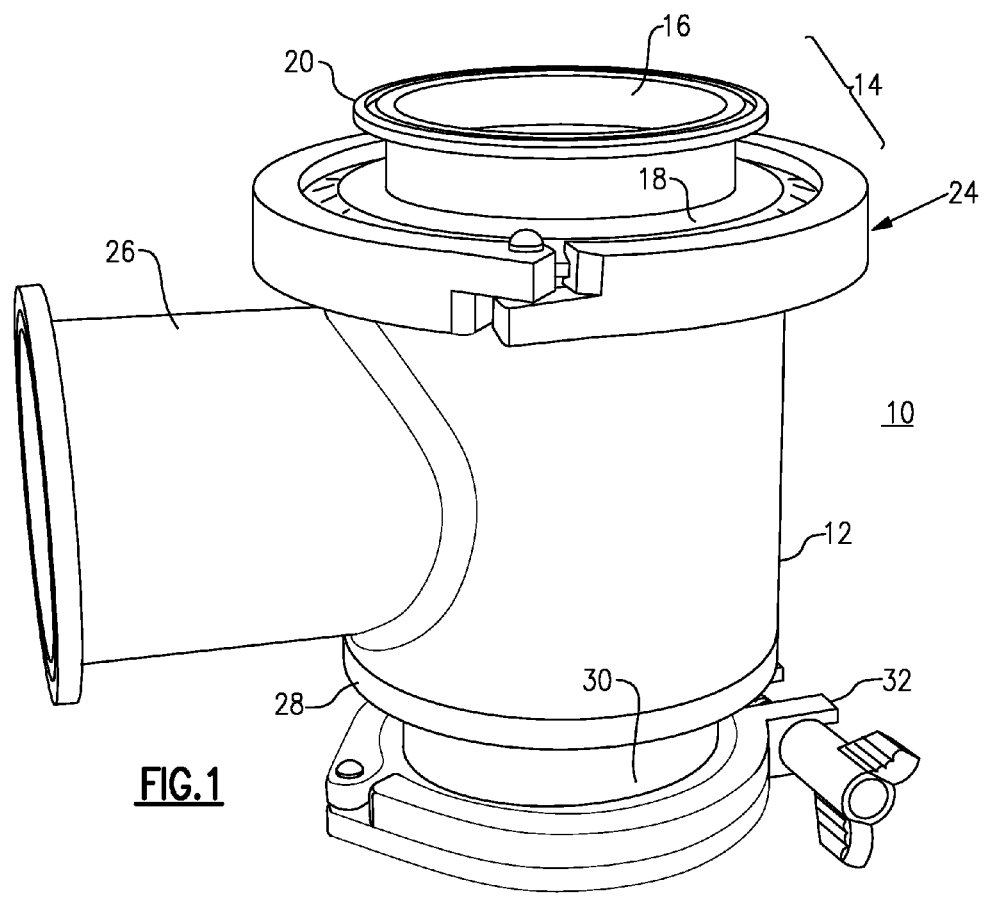
FIG. 1 is perspective view of an aseptic or sanitary diaphragm valve according to one embodiment of the invention.
Figure 3:
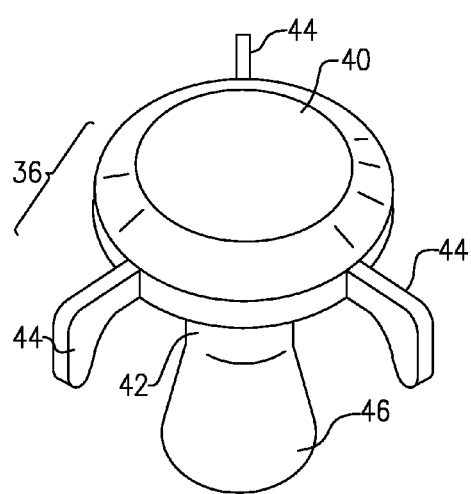
FIG. 3 is a perspective view of the valve plug of this embodiment.
Figure 2:
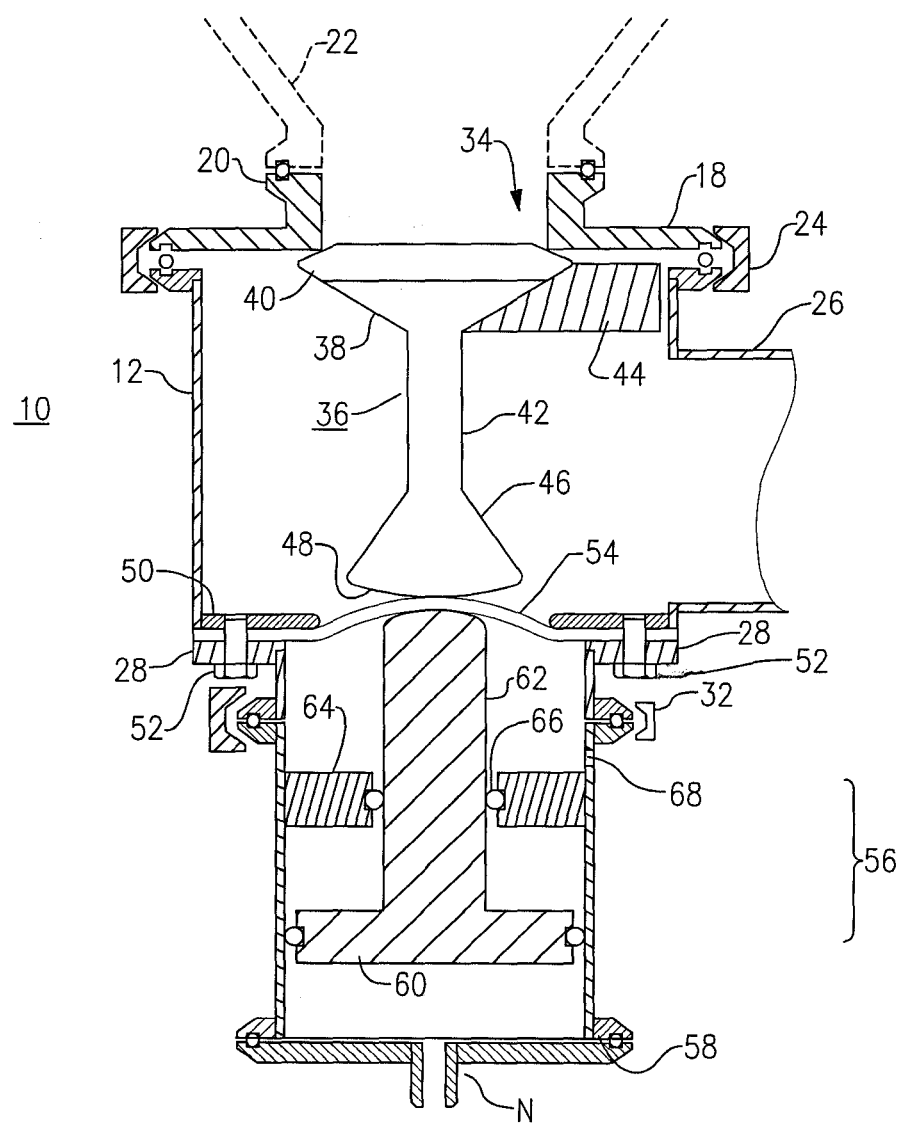
FIG. 2 is a cross sectional view thereof showing the housing, plug, diaphragm, and actuator.

With initial reference to the embodiment illustrated in FIGS. 1 to 3, an aseptic valve or sanitary valve 10 of the present invention may be employed on a sanitary conduit, or may be employed at a lower drain of a sanitary tank or vessel, adapted for a dairy product, another edible product such as fruit juice, sauce or soup, or a pharmaceutical product for human or veterinary use, or a cosmetic, beauty-related, or dermatological creme or liquid.

The aseptic or sanitary valve 10 of this embodiment has one inlet and one outlet, and may be employed at the drain or outlet of a vertical tank. Other embodiments of this valve may have two or more controlled outlets.

In the sanitary diaphragm valve 10 of this embodiment, a cylindrical valve housing 12 is formed of a cylindrical wall that defines a hollow valve space within it. An upper valve portion 14 is affixed onto the upper end of the housing 12 and includes an inlet tube 16 and a top plate 18 that has a center opening. In this embodiment there is an upper flange 20 at the top of the inlet tube 16, which attaches to the outlet or drain 22 of an associated sanitary tank (see FIG. 2). A tri-clamp or similar sealing clamp 24 may be used to hold these components securely together, with a gasket or gland (not shown) fitted between them.

An outlet tube 26 extends from an outlet opening in the side wall of the valve body 12. This discharges any fluid flowing to the valve body from the tank drain 22 into a subsequent stage (not shown). A bottom plate 28, which is part of a valve actuator housing (an upper part 30 of which is shown in FIG. 1), is secured, e.g., fastened with bolts or clamp, to the underside of the valve body 12, details of which are shown better in FIG. 2. A tri-clamp or sealing clamp 32 can secure the upper valve actuator housing 30 to lower portions which are also shown better in FIG. 2, and will be discussed below.

There is a round inlet opening 34 at the center of the flat top plate 18, with a beveled circumferential edge that serves as a seat for a valve plug 36 that is contained within the interior volume of the valve body or valve housing 12. Here the valve plug 36 is a floating valve plug, that is, it is not firmly attached to other components within the valve housing. The valve plug is aligned axially within the cylindrical valve housing 12, with a head portion 38 at its upper end. The head portion 38 has a valve face 40 at its upper side arranged to seat against the circumferential edge of the round inlet opening 34. Here, the upper face 40 is coated with a sanitary, food grade synthetic rubber material, e.g., Vitan. Below the head is a stem 42 that is disposed at the axis of the cylindrical housing 12. As shown in FIG. 3, the valve plug 36 has three radial spacer arms 44 that extend out transversely from the valve head 38 and loosely contact the interior cylindrical wall of the valve housing 12. These spacer arms serve to keep the floating plug properly aligned within the housing. At the lower end of the stem 42 is a foot portion 46. Preferably, the foot portion 46 has a curved, i.e., domed, lower side or sole 48, which facilitates entry of C.I.P. fluid between the plug 36 and the associated flexible diaphragm on which it rests (to be described shortly).

At the lower end or base of the valve housing 12 is a lower ring flange 50 (FIG. 2). The bottom plate 28 is secured to this ring flange 50, here using threaded fasteners 52. A flexible diaphragm 54, e.g., a sheet of silicone rubber, is secured here, sandwiched between the ring flange 50 and the bottom plate 28, as shown, and being exposed and subject to flexure at the aligned open centers of the flange 50 and bottom plate 28.

A lower actuator assembly, here in the form of an air actuator, is attached onto the actuator housing upper portion 30. A lower actuator housing 56, which serves as an air cylinder, is secured, e.g., with a tri-clamp, to the upper portion 30. An end plate 58 with air nipple N closes off the lower end of the cylindrical lower actuator housing 56. An air piston 60 is situated in the cylindrical housing 56. A valve actuator 62, here in the form of a rod, extends upward from the piston 60 so that its upper tip contacts the under side of the diaphragm 54. The cylindrical housing 56 is provided with an apertured mid-plate 64 and the actuator rod 62 passes through a center aperture in the plate 64. An O-ring seal 66 is provided in the center aperture of the mid-plate to form a sliding seal between the mid-plate 64 and the actuator rod 62 so that air does not pass into the zone above the mid-plate.

Also, in the preferred embodiments, there is a leakage-evident detector hole 68 in one wall of the actuator housing, either in the upper or lower part, so long as it is in a zone between the mid-plate 64 and the diaphragm 54. Any fluid that enters that zone, that is, the space below the diaphragm 54 and above the mid-plate 64, will seep out a leakage detection hole 68 at the side of the housing, and provide a visible indication of possible diaphragm failure. When this occurs, it is a simple matter to remove the tri-clamp or tri-clamps, remove the bolts or other threaded fasteners 52, and then change out the diaphragm 54. The change out can be performed in the plant, and does not require removing the valve from the tank or piping, nor is factory maintenance or repair needed. Also, in this design the control air does not leak into the fluid product, as any air escaping past the seal 66 vents out through the hole 68.

The travel distance or play of the plug 36 need only be one-half the radius of the valve inlet opening 30 and valve face 40 to achieve an unobstructed full flow of the liquid product.

In the design of this embodiment, there are no obstructed or closed off areas within the valve cavity within the valve housing 12. All surfaces of the plug 36 are free and can be reached by the clean-in-place fluid. This allows the valve 10 to be cleaned in place by flowing a cleaning solution through it followed by a sterilizing fluid or steam.

Figure 4:
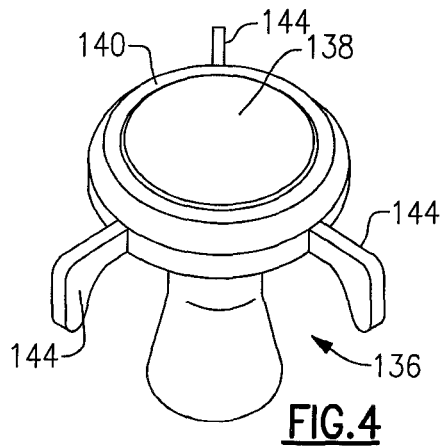
FIG. 4 is a perspective view of an alternative valve plug.

A variation of the valve plug of this sanitary diaphragm valve of this invention is shown in FIG. 4. The parts of this plug that correspond with parts of the plug of FIG. 3 are identified with similar reference numbers but raised by "100" and a detailed description of those elements need not be fully repeated. In this valve plug 136, there is a sealing O-ring 140 seated in an annular groove on the sealing face 138 of the plug head, rather than having the entire face coated with a rubber sealing material. Here, as in the plug 36 earlier described, there are three spacer arms 144 disposed at one-hundred-twenty degree intervals. These may extend from the head 138 or from the stem. The body of the plug may be steel, or may be fabricated of a suitable food-grade, durable plastic resin, or of a high-performance ceramic, or other material.

In a normal orientation, where the valve 10 is located directly below a tank drain, gravity and fluid pressure of the process fluid will suffice to open the valve plug once air pressure is relieved. However, the valve 10 can also be oriented in a sidewards orientation in some applications, that is, with the axis of the valve housing 12 and the axis of the plug 36 being disposed horizontally. For such applications, there may be a magnet (not shown) situated at the tip of the actuator rod 62, with the foot 46 of the plug being steel, so that the valve plug 36 moves in and out with the piston 60 and actuator rod 62.

Also, the actuator can employ a spring (not shown) to bias the piston 62 and rod 62 up against the diaphragm 54 and foot of the valve plug 36, for a normally-closed implementation. In that implementation, the compressed air may be applied to the upper side of the piston 60 to drive it down and overcome the spring pressure to open the valve.

In each of the described embodiments, the terms up, down, upper, lower, above and below are employed for simplicity of explanation in respect to the drawing figures. In any practical implementation, however, the valve assembly could be positioned in many other orientations. These terms as used in the specification and in the claims are not intended to limit the valve to any specific orientation.

The aseptic or sanitary diaphragm valves of this invention can be serviced in place, e.g., to replace any of the piston, plug or diaphragm, simply by removing the fasteners, disassembling the valve body, and replacing or changing out the diaphragms, piston(s) or any associated seals.

The sanitary diaphragm valve can be cleaned in place, as the construction of the valve flow space allows cleaning solution to reach every area of the valve cavity.

The construction of the valve is simple, but robust, without complex shapes of cavities or passageways, and with only a minimum number of required parts. Thus these sanitary diaphragm valves are inexpensive to manufacture, and simple to install and maintain. The valve is sturdy and reliable.

While the invention has been described with reference to a number of preferred embodiments, it should be understood that the invention is not limited only to those embodiments. Rather many variations are possible without departing from the scope and spirit of this invention, as defined in the appended Claims.

I claim:

1. An outlet drain valve arrangement for the lower end of a tank, comprising a drain outlet of a sanitary tank having a drain opening at its lower end and an aseptic or sanitary floating-plug diaphragm valve, wherein the diaphragm valve comprises:

a generally cylindrical valve body having a cylindrical wall which defines an axis of said valve body, at an upper end thereof an upper plate joined to said drain outlet and with a circular inlet aligned with said drain opening, the circular inlet having a circumferential edge forming a valve seat, and an annular plate disposed at a lower end of the cylindrical wall and having an open center, and a tubular outlet pipe extending from an opening in said cylindrical wall;

a floating valve plug disposed within said valve body and including a head having an upper valve face of round profile and disposed to seat against the circumferential edge of said circular inlet, a stem aligned axially with said axis that is defined by the cylindrical wall and extending from said head downward within said valve body, a foot portion formed at a lower end of said stem, and a plurality of radial arms extending from one or both of said head and said stem adjacent said head to an inner surface of said cylindrical wall and adapted to maintain said floating valve plug centered on the axis of said cylindrical valve body;

a flexible diaphragm situated across the open center of said annular plate at the lower end of the cylindrical wall, such that the foot of said floating valve plug rests upon but is detachable therefrom and does not penetrate the flexible diaphragm;

a valve actuator disposed beneath said valve body, and including a valve actuator housing having an annular flange at an upper end thereof with an open center and positioned against the annular plate of said valve body, and fastened thereto with said diaphragm sandwiched therebetween; and a valve actuator member held within said valve actuator housing, the valve actuator member having a travel distance along the axis of said valve body, and having an upper edge urging against said diaphragm, such that the valve actuator member at an upper end of its said travel distance urges the upper valve face of said plug against the circumferential edge of the circular inlet of the upper plate, and as it travels away from the upper end of its travel distance the actuator member permits the upper valve face of the plug to move away from said circumferential edge and permit flow of fluid through said circular inlet, into said valve body, and out through said outlet pipe.

2. The outlet drain valve arrangement of claim 1 wherein the foot portion of said valve plug has a domed bottom surface that rests on said diaphragm.

3. The outlet drain valve arrangement of claim 1 wherein said plurality of radial arms includes three spacer arms disposed at 120 degree intervals about said valve plug.

4. The outlet drain valve arrangement of claim 1 wherein said flexible diaphragm comprises a flat sheet of a silicone rubber.

5. The outlet drain valve arrangement of claim 1 wherein said upper plate is substantially flat.

* * * * *